US009817802B2

(12) United States Patent
Bank et al.

(10) Patent No.: US 9,817,802 B2
(45) Date of Patent: *Nov. 14, 2017

(54) INTELLIGENT AUTOMATIC EXPANSION/CONTRACTION OF ABBREVIATIONS IN TEXT-BASED ELECTRONIC COMMUNICATIONS

(75) Inventors: Judith H. Bank, Morrisville, NC (US); Erik S. Bryant, Wake Forest, NC (US); Gary Denner, Dublin (IE); Patrick O'Sullivan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 974 days.

This patent is subject to a terminal disclaimer.

(21) Appl. No.: 13/483,365

(22) Filed: May 30, 2012

(65) Prior Publication Data

US 2013/0191739 A1    Jul. 25, 2013

Related U.S. Application Data

(63) Continuation of application No. 13/357,721, filed on Jan. 25, 2012.

(51) Int. Cl.
    *G06F 17/00*    (2006.01)
    *G06F 17/22*    (2006.01)
    *G06F 17/24*    (2006.01)

(52) U.S. Cl.
    CPC ...... *G06F 17/2276* (2013.01); *G06F 17/2264* (2013.01); *G06F 17/24* (2013.01)

(58) Field of Classification Search
    CPC .................................................. G06F 17/2276
    See application file for complete search history.

(56) References Cited

U.S. PATENT DOCUMENTS 4,459,049 A  *  7/1984  Howell ................ G06F 17/276
                                                   400/17
4,760,528 A  *  7/1988  Levin .................. G06F 17/276
                                                   400/98

(Continued)

OTHER PUBLICATIONS

Fu, G.-et al.; "A hybrid approach to Chinese abbreviation expansion"; Computer Processing of Oriental Languages; Beyond the Orient The Research Challenge Ahead; 21st International Conference (ICCPOL 2006); pp. 277-287; 2006.

(Continued)

*Primary Examiner* — Scott Baderman
*Assistant Examiner* — Benjamin J Smith
(74) *Attorney, Agent, or Firm* — Yee & Associates, P.C.; Nicholas F. Bowman (57) ABSTRACT

A method for intelligently handling abbreviations in text-based electronic communications can begin with the compilation of abbreviation usage history data by an intelligent abbreviation handler component of a text-based electronic communications system. The abbreviation usage history data can indicate a presentation preference for abbreviation elements based upon past usage by the user. An abbreviation element can be an abbreviation, an acronym, or an initialism. The abbreviation element can be presented in a condensed format or an expanded format. Abbreviation elements can be identified in a received text-based electronic communication. The presentation preference of each identified abbreviation element can be intelligently determined for each recipient from the abbreviation usage history data. An abbreviation-adjusted text-based electronic communication can be created for each recipient using the received text-based electronic communication and the determined presentation preference. The abbreviation-adjusted text-based electronic communication can be conveyed to the recipient.

13 Claims, 5 Drawing Sheets

(56) References Cited

U.S. PATENT DOCUMENTS

| | | | | |
|---|---|---|---|---|
| 5,247,591 A * | 9/1993 | Baran | H04N 1/00968 | 283/117 |
| 5,551,049 A | 8/1996 | Kaplan et al. | | |
| 5,634,084 A * | 5/1997 | Malsheen | G06F 17/273 | 704/260 |
| 6,279,018 B1 * | 8/2001 | Kudrolli | G06F 17/28 | 704/1 |
| 6,671,670 B2 * | 12/2003 | Levin | G10L 13/08 | 704/10 |
| 6,684,211 B1 * | 1/2004 | Nguyen | G06F 17/24 | |
| 6,708,311 B1 * | 3/2004 | Berstis | G06F 17/273 | 715/205 |
| 6,934,767 B1 * | 8/2005 | Jellinek | G06Q 10/10 | 235/375 |
| 6,966,030 B2 | 11/2005 | Ashford et al. | | |
| 7,003,724 B2 * | 2/2006 | Newman | H04L 29/06 | 709/206 |
| 7,028,038 B1 * | 4/2006 | Pakhomov | G06F 17/277 | 704/275 |
| 7,092,928 B1 * | 8/2006 | Elad | G06F 17/3089 | 704/260 |
| 7,236,923 B1 * | 6/2007 | Gupta | G06F 17/277 | 704/7 |
| 7,293,074 B1 * | 11/2007 | Jellinek | G06Q 10/10 | 709/217 |
| 7,515,903 B1 * | 4/2009 | Cast | H04L 51/066 | 455/413 |
| 7,536,297 B2 | 5/2009 | Byrd et al. | | |
| 7,831,423 B2 | 11/2010 | Schubert | | |
| 7,848,918 B2 * | 12/2010 | Li | G06F 17/28 | 704/10 |
| 7,885,949 B2 * | 2/2011 | Gabbert | G06F 17/30595 | 707/705 |
| 7,895,032 B2 * | 2/2011 | Mullen | G06F 17/248 | 704/257 |
| 8,171,403 B2 * | 5/2012 | Flint | G06F 17/2282 | 715/261 |
| 8,209,183 B1 | 6/2012 | Patel | G06K 9/72 | 382/181 |
| 8,498,999 B1 * | 7/2013 | Bhalotia | G06F 17/3064 | 707/767 |
| 8,504,369 B1 * | 8/2013 | Chigier | G06F 17/24 | 704/246 |
| 9,311,286 B2 | 4/2016 | Bank et al. | | |
| 2001/0049725 A1 * | 12/2001 | Kosuge | G06F 17/2223 | 709/206 |
| 2003/0018670 A1 * | 1/2003 | Ashford | G06F 17/278 | 715/236 |
| 2003/0139921 A1 * | 7/2003 | Byrd | G06F 17/2775 | 704/10 |
| 2004/0249667 A1 | 12/2004 | Oon | | |
| 2005/0160065 A1 | 7/2005 | Seeman | | |
| 2005/0240391 A1 * | 10/2005 | Lekutai | H04M 1/72552 | 704/2 |
| 2006/0129633 A1 * | 6/2006 | Potluri | G06F 17/22 | 709/203 |
| 2006/0167992 A1 * | 7/2006 | Cheung et al. | | 709/204 |
| 2007/0094008 A1 | 4/2007 | Huang | | |
| 2007/0174045 A1 * | 7/2007 | Kao | G06F 17/278 | 704/4 |
| 2007/0276649 A1 * | 11/2007 | Schubert | G06F 17/2872 | 704/2 |
| 2007/0299925 A1 * | 12/2007 | Kirkland | G06F 17/2205 | 709/206 |
| 2008/0059152 A1 * | 3/2008 | Fridman | G06F 17/2735 | 704/9 |
| 2008/0162426 A1 | 7/2008 | Haug | | |
| 2008/0274756 A1 | 11/2008 | Hassan | | |
| 2009/0171937 A1 * | 7/2009 | Chen | G06Q 10/107 | |
| 2009/0248401 A1 * | 10/2009 | Grabarnik | G06F 17/2735 | 704/10 |
| 2010/0131900 A1 * | 5/2010 | Spetalnick | G06F 17/276 | 715/825 |
| 2010/0169075 A1 * | 7/2010 | Raffa | G10L 13/00 | 704/9 |
| 2010/0305941 A1 * | 12/2010 | Hogan | G06F 17/27 | 704/9 |
| 2011/0107206 A1 * | 5/2011 | Walsh | G06F 17/2785 | 715/256 |
| 2011/0135071 A1 | 6/2011 | Milstein | | |
| 2011/0138076 A1 * | 6/2011 | Spicer | H04L 51/066 | 709/246 |
| 2011/0244882 A1 * | 10/2011 | Hancock | H04W 4/02 | 455/456.1 |
| 2012/0054645 A1 * | 3/2012 | Hoomani | G06F 17/2836 | 715/758 |
| 2012/0192059 A1 * | 7/2012 | Laskaris | G06F 17/2264 | 715/231 |
| 2012/0290950 A1 * | 11/2012 | Rapaport | H04L 51/32 | 715/753 |
| 2013/0191738 A1 | 7/2013 | Bank et al. | | |
| 2013/0191739 A1 * | 7/2013 | Bank | G06F 17/2276 | 715/259 |
| 2014/0256297 A1 * | 9/2014 | Cast | H04L 51/066 | 455/413 |
| 2014/0310643 A1 * | 10/2014 | Karmanenko | G06F 1/1626 | 715/784 |

OTHER PUBLICATIONS

Anonymous; "Mechanism for Safer Text Messaging"; http://priorartdatabase.com/IPCOM000208831D; Jul. 19, 2011.

Van Wijk, A.-et al.; "Framework for Real-Time Text over IIP Using the Session Initiation Protocol (SIP)"; http://www.ip.com/pubview/IPCOM000171305D; Jun. 1, 2008.

"PhraseExpress 12.0.142", Top4Download.com, Mar. 2017, 3 pages. http://www.top4download.com/phraseexpress/ueplutlo.html%20-%20phrase%20express%20expands%20abbreviations.

"Tools that help with acronyms and jargon in software requirement documents", Stack Exchange Inc., Jan. 2011, 2 pages. http://english.stackexchange.com/questions/7913/tools-that-help-with-acronyms-and-jargon-in-software-requirement-documents.

NAZ, "Configurable Meta-search in the Human Resource Domain", Dissertation, Vienna University of Technology, May 2009, 150 pages.

Terada et al., "Automatic Expansion of Abbreviations by using Context and Character Information", Information Processing & Management, vol. 40, No. 1, Jan. 2004, pp. 31-45.

Office Action, dated Feb. 12, 2015, regarding U.S. Appl. No. 13/357,721, 18 pages.

Final Office Action, dated Oct. 23, 2015, regarding U.S. Appl. No. 13/357,721, 15 pages.

Notice of Allowance, dated Jan. 14, 2016, regarding U.S. Appl. No. 13/357,721, 12 pages.

\* cited by examiner

INTELLIGENT AUTOMATIC EXPANSION/CONTRACTION OF ABBREVIATIONS IN TEXT-BASED ELECTRONIC COMMUNICATIONS

CROSS-REFERENCE TO RELATED APPLICATION

This application is a continuation of U.S. patent application Ser. No. 13/357,721, filed Jan. 25, 2012 (pending), which is incorporated herein in its entirety.

BACKGROUND

The present invention relates to the field of electronic communications and, more particularly, to the intelligent automatic expansion/contraction of abbreviations in text-based electronic communications.

Text-based electronic communications (e.g., emails, instant messages, text messages, social network postings, etc.) have become a key part of many aspects of daily life—home, office, social, and community. These electronic communications often include a variety of abbreviations, including acronyms, initialisms, and shortened word formats. In fact, a whole set of abbreviations have been developed to reduce the number of key strokes when writing text and/or instant messages. For example, a person can type "LOL" to abbreviate the phrase "Laugh Out Loud".

Abbreviations are also commonplace in technical and/or military environments. Often times, the same abbreviation means different things in different contexts and/or environments. For example, the acronym "RSS", an information technology (IT) setting, is able to stand for Rich Site Summary, Really Simple Syndication, Recording and Streaming Server, as well as other definitions. In a military setting, RSS stands for Regimental Support Squadron, Rescue Swimmer School, Radar Support System, and others. These multiple meanings severely reduce the communication efficiency originally provided by using abbreviations.

Approaches have been developed to address the issue of multiple meanings by automatically expanding or contracting abbreviations in text-based communications based upon context. While such an approach is helpful to some degree, ambiguous abbreviations are still problematic, especially when multiple definitions of an abbreviation are applicable to the context. These tools and approaches disregard the sender's and/or recipient's prior usage of the abbreviation to guide usage.

Further, these approaches assume that all viewers or recipients of the communication wish to view the text in the same manner. Individualized presentation of abbreviations is unavailable. That is, using such an approach, a recipient who prefers to have expanded abbreviations contracted (e.g., prefers to see "on my way" as "omw") is unable to have their communications presented as such.

BRIEF SUMMARY

One aspect of the present invention can include a method for intelligently handling abbreviations in text-based electronic communications. Such a method can begin with the compilation of abbreviation usage history data for abbreviation elements by an intelligent abbreviation handler component of a text-based electronic communications system. The abbreviation usage history data can be applicable to registered or identified users of the text-based electronic communications system. The abbreviation usage history can indicate a presentation preference for an abbreviation element based upon past usage of the abbreviation element by a user. An abbreviation element can be an abbreviation, an acronym, or an initialism. The abbreviation element can be presented in a condensed format or an expanded format that expresses a full meaning of the condensed format. Abbreviation elements can be identified in a received text-based electronic communication. The presentation preference can be intelligently determined for each recipient and identified abbreviation element from the abbreviation usage history data. An abbreviation-adjusted text-based electronic communication can be created for each recipient using the received text-based electronic communication and the determined presentation preference. The abbreviation-adjusted text-based electronic communication can then be conveyed to the recipient.

Another aspect of the present invention can include a system for intelligently handling abbreviations. Such a system can include text-based electronic communications, a text-based electronic communications system, abbreviation usage history data, an abbreviation dictionary, and an intelligent abbreviation handler. The text-based electronic communications can contain abbreviation elements presented in a condensed format or an expanded format that expresses a full meaning of the condensed format. The text-based electronic communications system can be configured to distribute the text-based electronic communications among users of the text-based electronic communications system. The abbreviation usage history data can represent a presentation preference for abbreviation elements based upon past usage of the abbreviation element in text-based electronic communications by the users of the text-based electronic communications system. The abbreviation dictionary can contain pairings that associate the condensed formats of abbreviation elements with corresponding expanded formats. The intelligent abbreviation handler can be configured to intelligently modify abbreviation elements contained in the text-based electronic communication in accordance with the presentation preference of a recipient prior to delivery to the recipient. The recipient can receive an abbreviation-adjusted text-based electronic communication in lieu of the original text-based electronic communication.

Yet another aspect of the present invention can include a computer program product that includes a computer readable storage medium having embedded computer usable program code. The computer usable program code can be configured to compile abbreviation usage history data for abbreviation elements contained in text-based electronic communications handled by a text-based electronic communications system. In one embodiment, the abbreviation usage history data can be applicable to registered or identified users of the text-based electronic communications system. The abbreviation usage history can indicate a presentation preference for an abbreviation element based upon past usage of the abbreviation element in text-based electronic communications. The abbreviation element can be an abbreviation, an acronym, or an initialism. The abbreviation element can be presented in a condensed format or an expanded format that expresses a full meaning of the condensed format. The computer usable program code can be configured to identify abbreviation elements in a received text-based electronic communication that is addressed to at least one recipient. The computer usable program code can be configured to intelligently determine the presentation preference of the recipients for the identified abbreviation elements from the abbreviation usage history data. The computer usable program code can be configured to create an abbreviation-adjusted text-based electronic communication for each recipient using the received text-based electronic communication and the determined presentation preference for a recipient for the abbreviation elements. The computer usable program code can then be configured to convey the abbreviation-adjusted text-based electronic communication to the recipients.

In one embodiment, abbreviations not found in a usage history associated with a user can result in a dynamic search being performed for that abbreviation. For example, a set of external sources (such as a social network source for the user and/or Web published content by the user) can be queried to determine the user's abbreviation usage preference(s). In one embodiment, information discovered in this manner can be added to the usage history for future use. Thus, the usage history can be dynamically expanded using external data sources in contemplated embodiments of the disclosure. Moreover, the same process (for dynamically expanding the usage history) can be used to initialize a usage history for a new user, thereby lowering set-up time and minimizing the entry barrier for new users.

Further, embodiments of the disclosure are contemplated where users need not register and where the usage history per user need not be maintained. In such an embodiment, "usage history" (or any data associated with usage history in the disclosure) for any specific abbreviation can be dynamically determined/discovered as needed. For example, information sources having stored examples of the user's writing, writing style, and/or writing preferences can be dynamically queried. A user's preference for one or more abbreviations can be determined dynamically (e.g., "on the fly") from this information, which causes abbreviations of a new text-based communication to be adjusted in accordance with these preferences.

Different embodiments of the invention can be implemented at the sender's side (i.e., the adjustment is tailored for one or more recipients by the sender's system before text communications are sent from a sender to each of the recipients), can be implemented at the recipient's side (i.e., a recipient can receive an original message, which is modified by a recipient's system before being presented to the recipient), or can be implemented at points in-between (i.e., abbreviation customizing can be implemented as a Web service transparently linked to a backend communication server used by the sender and recipient; abbreviation customizing can be implemented as an optional Web service, which either the sender or recipient can subscribe to, etc.).

In different contemplated embodiments, users can establish their own preferences through user interfaces through which the text communications are sent/received to tailor responses. Further, default conditions can be overridden (favoring the condensed format for informal communications and expanded format for formal communications, for example) by manual selection or by a set of variable conditions associated with text communications and associated rules configurable by a user, established by a software developer, or the like.

DETAILED DESCRIPTION

The present invention discloses a solution for intelligently handling abbreviations in text-based electronic communication. An intelligent abbreviation handler can compile abbreviation usage history for users of a text-based electronic communications system. Based on the abbreviation usage history, the format of abbreviation elements used in new text-based electronic communications can be modified to reflect a recipient's presentation preference.

In embodiments, the disclosure identifies at least one abbreviation element by analyzing textual contents of the received text-based electronic communication with respect to an abbreviation dictionary. The abbreviation dictionary can contain a plurality of pairings that associate condensed formats of abbreviation elements with corresponding expanded formats. In the embodiment, when a portion of the textual contents match an entry in the abbreviation dictionary, the portion is flagged as an abbreviation element. In one embodiment, a presentation preference can be determined for at least one recipient for an identified abbreviation element from abbreviation usage history data. In embodiments, this determination includes querying the abbreviation usage history data for a combination of the recipient and either format of an identified abbreviation element. When the combination exists in the abbreviation usage history data, a format contained in the combination can be designated as the presentation preference of the recipient for the identified abbreviation element. In embodiments, when the combination is absent from the abbreviation usage history data, the abbreviation dictionary is queried for the identified abbreviation element; a context in which the identified abbreviation element is used within the text-based electronic communication is determined; the determined context of the identified abbreviation element is correlated with query results from the abbreviation dictionary; and when a match exists between the determined context and a single entry from the abbreviation dictionary, the abbreviation usage history data is updated for a sender of the text-based electronic communication with the identified abbreviation element. In embodiments, when a combination is absent from the abbreviation usage history data, clarification is requested from a sender of the text-based electronic communication; and the abbreviation usage history data is updated for the sender with the clarification received from the sender. In embodiments, when the combination is absent from the abbreviation usage history data, the abbreviation usage history data for a combination of a sender of the text-based electronic communication and either format of the identified abbreviation element is queried; and when the combination exists in the abbreviation usage history data, the format contained in the combination is designated as the presentation preference of the recipient for the identified abbreviation element. In embodiments, when the combination is absent from the abbreviation usage history data and absent from the abbreviation dictionary for the identified abbreviation element, Web content, social communications, or both is searched for the identified abbreviation element and updating the abbreviation usage history data using results from the searching. In embodiments, the abbreviation-adjusted text-based electronic communication is created by copying the received text-based electronic communication; when an existing format of an identified abbreviation element differs from the format contained in the presentation preference, by automatically replacing the existing format of the identified abbreviation element with the format from the presentation preference; and by once all identified abbreviation elements have been addressed, designating the copy of the received text-based electronic communication as the abbreviation-adjusted text-based electronic communication for the recipient.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
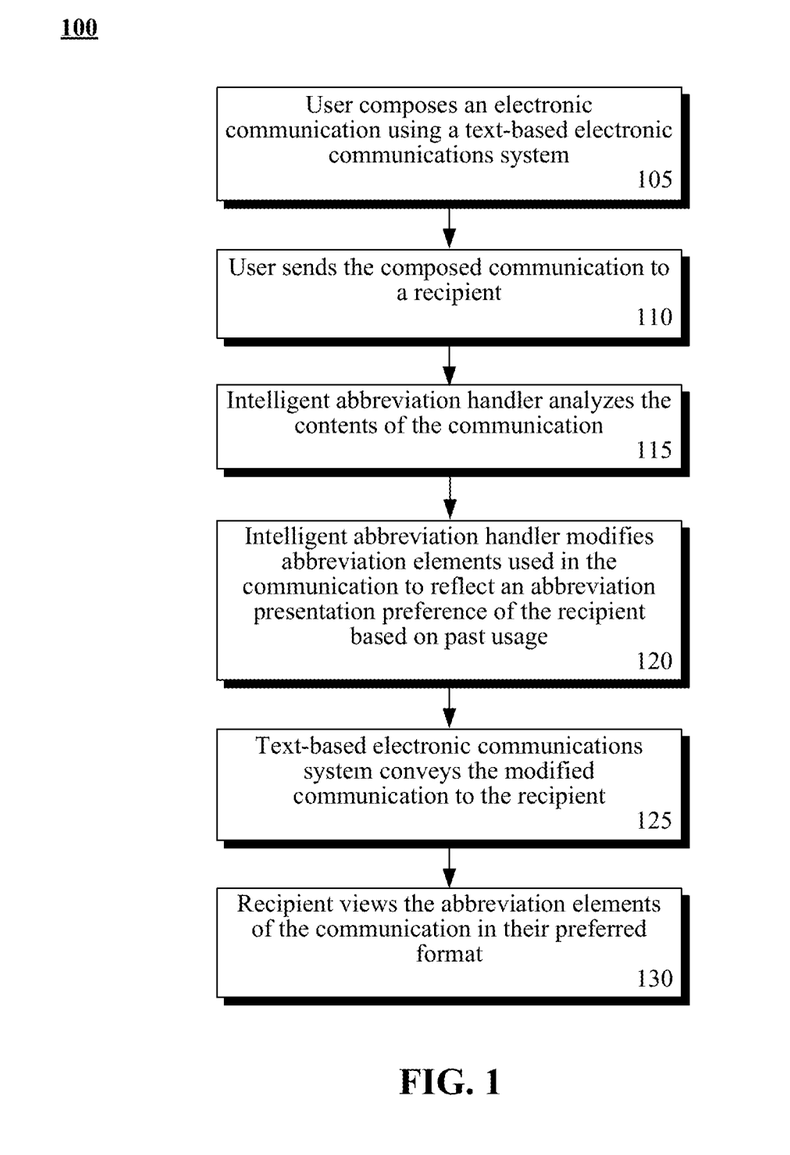
FIG. 1 is a flowchart of a method describing the general use of a intelligent abbreviation handler to customize abbreviation presentation within a text-based electronic communication in accordance with embodiments of the inventive arrangements disclosed herein.

FIG. 1 is a flowchart of a method 100 describing the general use of a intelligent abbreviation handler to customize abbreviation presentation within a text-based electronic communication in accordance with embodiments of the inventive arrangements disclosed herein. The term "abbreviation", as used herein, can apply to various linguistic constructs used to shorten a word or phrase into a single element, including, but not limited to, abbreviations, acronyms, initialisms, and the like.

Method 100 can begin in step 105 where a user can compose an electronic communication, herein referred to as a communication, using a text-based electronic communications system. Examples of the communication can include, but are not limited to, an email, a text message, an instant message, a blog post, a social network posting, and the like.

The composed communication can be sent by the user to a recipient via the text-based communications system in step 110. It should be noted that, in the case of public or semi-public postings (e.g., blog), the intended recipient can be a group or subgroup of people who have access to the posting area. Further, step 110 can be expanded to include distribution to multiple recipients without altering the spirit of the present disclosure.

In step 115, the intelligent abbreviation handler can analyze the contents of the communication. Based on this analysis, the intelligent abbreviation handler can modify abbreviation elements used in the communication to reflect the abbreviation presentation preference of the recipient in step 120. The abbreviation presentation preference of the recipient can be based upon the recipient's past usage of the abbreviation.

For example, the recipient may prefer certain abbreviations expanded to their full length or phrase and others contracted or condensed.

In step 125, the text-based electronic communications system can convey the modified communication to the recipient. In another embodiment, the modification of the communication can occur after the communication is delivered but before it is presented to the recipient. The recipient can then view the communication with the abbreviation elements in the recipient's preferred format in step 130.

Figure 2:
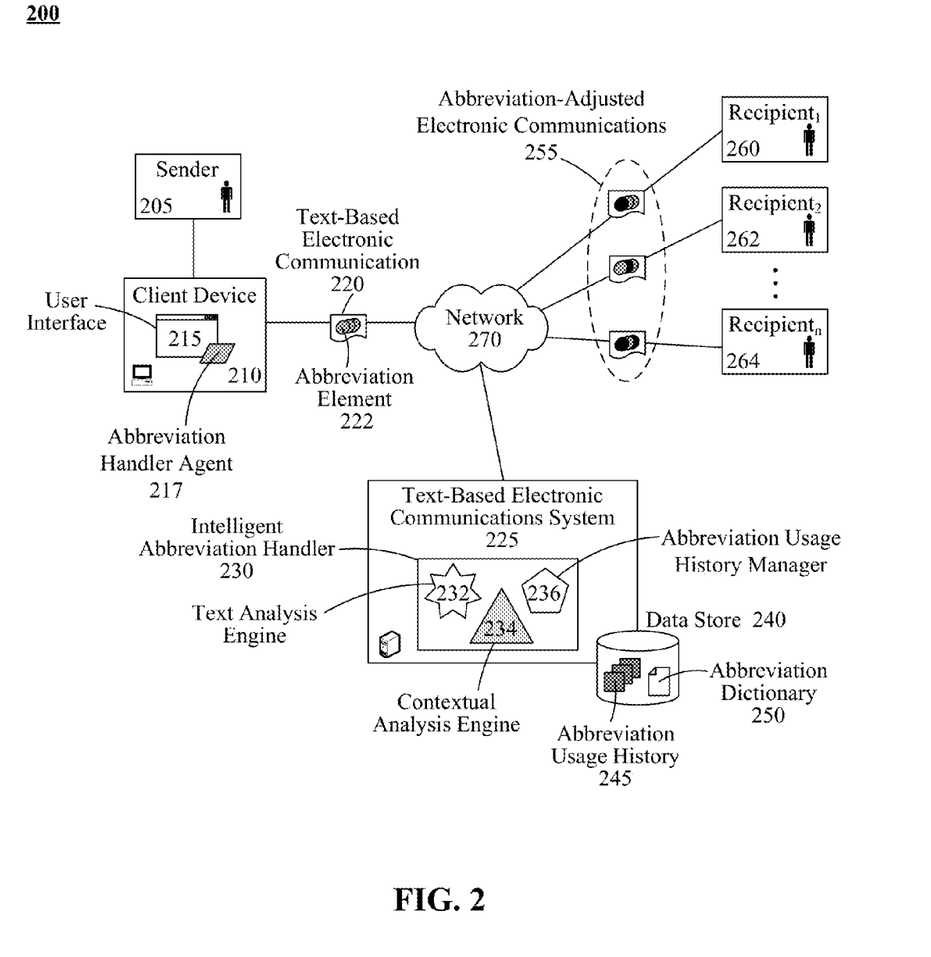
FIG. 2 is a schematic diagram illustrating a system that utilizes a intelligent abbreviation handler to provide individualized abbreviation-adjusted electronic communications to intended recipients of a text-based electronic communication in accordance with an embodiment of the inventive arrangements disclosed herein.

FIG. 2 is a schematic diagram illustrating a system 200 that utilizes an intelligent abbreviation handler 230 to provide individualized abbreviation-adjusted electronic communications 255 to intended recipients 260-264 of a text-based electronic communication 220 in accordance with embodiments of the inventive arrangements disclosed herein. System 200 can be used to perform the steps of method 100.

In system 200, the sender 205 can create a text-based electronic communication 220 using a user interface 215 of the text-based electronic communications system 225. The text-based electronic communication 220 can be a digital container for user-entered textual data that can include one or more abbreviation elements 222.

The text-based electronic communication 220 can represent a variety of text-based electronic messages, including, but are not limited to, an email, a text message, an instant message, a blog post, a social network posting, and the like. It should be noted that the text-based electronic communication 220 can be coupled with other media types in the message container like a file attachment to an email having a textual body.

An abbreviation element 222 can represent a single instance where an abbreviation, in either its condensed or expanded form, is used within the text of the text-based electronic communication 220. For example, the phrase, "All Points Bulletin", can be an expanded form of "APB", the condensed form.

The text-based electronic communications system 225 can represent the hardware and/or software components necessary to handle the conveyance of text-based electronic communications 220 between the sender 205 and recipients 260-264 over a network 270. Text-based electronic communications systems 225 are well known in the art, and, therefore, details relating to specific components and/or functionalities need not be discussed herein.

It should be noted, however, that the text-based electronic communications system 225 can include a variety of components not shown in system 200, and whose operation are not influential to this embodiment of the present disclosure; only those components involved with this embodiment of the present disclosure shall be discussed in relation to system 200.

In another embodiment, the text-based electronic communications system 225 can be a component of a more comprehensive multi-media communications system that supports various types (e.g., audio, video, etc.) of communications.

The text-based electronic communications system 225 can include the user interface 215, an intelligent abbreviation handler 230, and a data store 240 containing an abbreviation usage history 245 and an abbreviation dictionary 250. The usage history 245 is optional in some embodiments, as user preference can be determined by dynamically querying and analyzing a set of one or more external sources of information, each containing samplings of text for ascertaining user abbreviation preferences. The user interface 215 can be a graphical user interface operating upon the computing device 210 of the sender 205 and recipients 260-264 (not shown) that allows the execution of text-based electronic communications system 225 functions (i.e., create and view text-based electronic communications 220).

The client device 210 can represent a variety of computing devices capable of supporting operation of the user interface 215 and communicating with the text-based electronic communications system 225 over the network 270.

The intelligent abbreviation handler 230 can represent the hardware and/or software components required to provide recipients 260-264 with abbreviation-adjusted electronic communications 255 of the sender's 205 original text-based electronic communication 220. The intelligent abbreviation handler 230 can include an abbreviation handler agent 217, a text analysis engine 232, a contextual analysis engine 234, and an abbreviation usage history manager 236.

The text analysis engine 232 can be the component of the intelligent abbreviation handler 230 that parses the text of the text-based electronic communication 220 to identify abbreviation elements 222 using the abbreviation dictionary 250. The abbreviation dictionary 250 can be a collection of abbreviation elements 222, pairing the condensed format with one or more expanded formats or definitions.

For example, the abbreviation dictionary 250 can correlate the condensed abbreviation element 222, "ABS", with the expanded abbreviation elements 222 of "Antilock Braking System", "Absolute", "Abdominals", and others.

In another contemplated embodiment, the abbreviation dictionary 250 can be remotely-located from the intelligent abbreviation handler 230, such as stored on a database server (not shown) or hosted by a third-party entity. In such an embodiment, the intelligent abbreviation handler 230 can communicate with the server or entity hosting the abbreviation dictionary 250 over the network 270.

The contextual analysis engine 234 can examine the contents of the text-based electronic communication 220 to determine the context in which the abbreviation elements 222 are being used. The context determined by the contextual analysis engine 234 can be used to select the appropriate abbreviation or meaning in cases of ambiguity or multiple available definitions.

The abbreviation usage history manager 236 can be the component of the intelligent abbreviation handler 230 that compiles the abbreviation usage history 245 for the sender 205 and/or recipients 260-264. The abbreviation usage history 245 can represent a log of abbreviations used by the sender 205 in text-based electronic communications 220 and the format (e.g., expanded or condensed).

Since recipients 260-264 can also take the role of sender 205, the abbreviation usage history 245 can also include data for the recipients 260-264. Thus, the abbreviation usage history 245 can be thought of as documenting the format of an abbreviation element 222 that a viewer (sender 205/recipient 260, 262, or 264) prefers that abbreviation element 222 to be presented.

For example, the abbreviation usage history 245 can indicate that the sender 205 writes "as soon as possible" more often than "ASAP"; recipient$_1$ 260 uses "ASAP" more often; and, recipient$_2$ 262 and recipient$_n$ 264 prefer "as soon as possible". Thus, when the sender 205 writes "as soon as possible" in a text-based electronic communication 220, the intelligent abbreviation handler 230 can replace that phrase with the condensed form, "ASAP", in the abbreviation-adjusted electronic communication 255 sent to recipient$_1$ 260.

The intelligent abbreviation handler 230 can also utilize an abbreviation handler agent 217 that operates upon the client device 210 of the sender 205 and/or recipient 260, 262, and 264. The abbreviation handler agent 217 can be a software application that operates in conjunction with the user interface 215 to provide the sender 205 with feedback and/or options for utilizing the intelligent abbreviation handler 230. The abbreviation handler agent 217 can be provided as a component (i.e., plug-in) of the user interface 215.

For example, the abbreviation handler agent 217 can send the intelligent abbreviation handler 230 a sentence as the sender 205 composes the text-based electronic communication 220. The intelligent abbreviation handler 230 can then process the sentence and return unresolved or ambiguous abbreviation elements 222 to the abbreviation handler agent 217, which can request clarification from the sender 205.

Network 270 can include any hardware/software/and firmware necessary to convey data encoded within carrier waves. Data can be contained within analog or digital signals and conveyed though data or voice channels. Network 270 can include local components and data pathways necessary for communications to be exchanged among computing device components and between integrated device components and peripheral devices. Network 270 can also include network equipment, such as routers, data lines, hubs, and intermediary servers which together form a data network, such as the Internet. Network 270 can also include circuit-based communication components and mobile communication components, such as telephony switches, modems, cellular communication towers, and the like. Network 270 can include line based and/or wireless communication pathways.

As used herein, presented data store 240 can be a physical or virtual storage space configured to store digital information. Data store 240 can be physically implemented within any type of hardware including, but not limited to, a magnetic disk, an optical disk, a semiconductor memory, a digitally encoded plastic memory, a holographic memory, or any other recording medium. Data store 240 can be a stand-alone storage unit as well as a storage unit formed from a plurality of physical devices. Additionally, information can be stored within data store 240 in a variety of manners. For example, information can be stored within a database structure or can be stored within one or more files of a file storage system, where each file may or may not be indexed for information searching purposes. Further, data store 240 can utilize one or more encryption mechanisms to protect stored information from unauthorized access.

Figure 3:
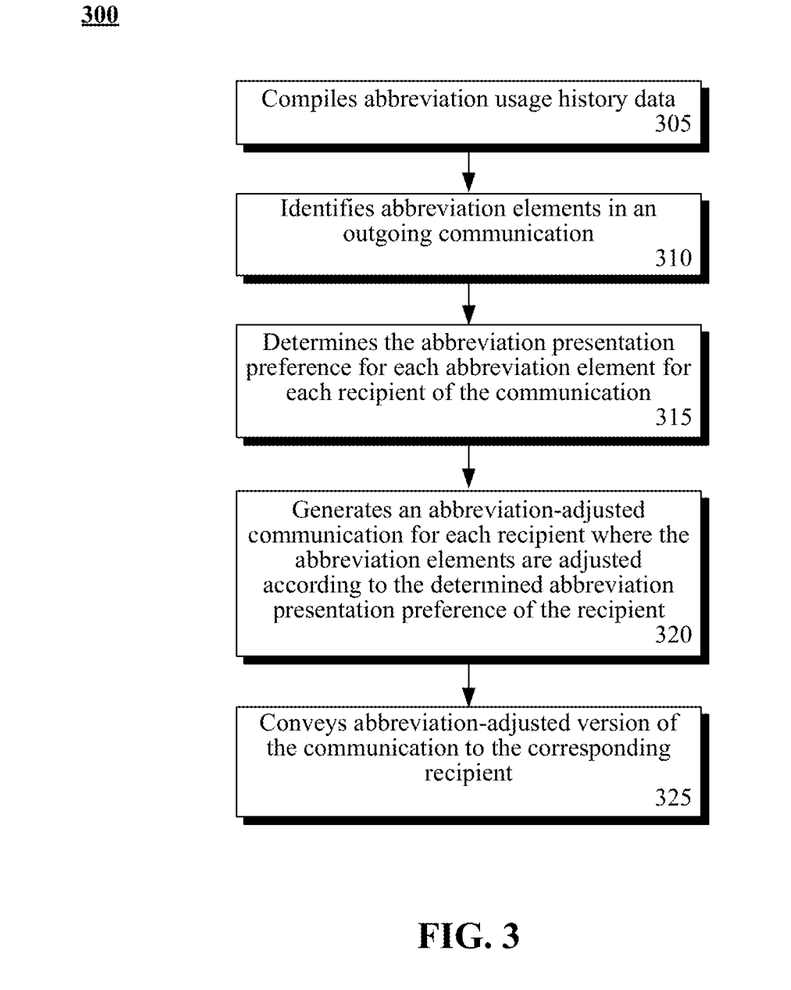
FIG. 3 is a flowchart of a method describing the basic operation of the intelligent abbreviation handler in accordance with an embodiment of the inventive arrangements disclosed herein.

FIG. 3 is a flowchart of a method 300 describing the basic operation of the intelligent abbreviation handler in accordance with embodiments of the inventive arrangements disclosed herein. Method 300 can be performed within the context of system 200, and/or in conjunction with method 100.

Method 300 can begin in step 305 where the intelligent abbreviation handler can compile abbreviation usage history data. In one embodiment, this compiling can occur iteratively (as communications involving a user occur) over time. The compiling can also dynamically occur, such as occurring on-demand in response to a need for usage preference data related to an abbreviation for which persisted history is not recorded. Dynamic compiling can occur using Web-based or network based sources of information, which may or may not (depending on implementation specifics of embodiments of the disclosure) be used to enhance, update, or supplement a data store of usage history data maintained for abbreviation handling purposes. Abbreviation elements can be identified in an outgoing communication in step 310. This identification can occur by matching abbreviation elements against a list of known abbreviations. The identification can also occur responsive to detecting possible "misspellings" or "grammar mistakes" which are indicative a possible existence and use of a previously unrecorded abbreviation. In the case of possible abbreviations, Web sources and other information repositories can be dynamically queried to determine if an unknown word or phrase is to be considered an abbreviation or not.

In step 315, the abbreviation presentation preference for each abbreviation element can be determined for each recipient of the communication. That is, the intelligent abbreviation handler can look up the format that the recipient prefers from their abbreviation usage history. General "preferences" or default preferences can be established for handling new abbreviations or handling any abbreviation lacking an entry in the table based on the abbreviation usage history.

An abbreviation-adjusted electronic communication can then be generated for each recipient in step 320. The abbreviation-adjusted communication can have the abbreviation elements of the original communication adjusted (e.g., condensed or expanded) in accordance with the determined abbreviation presentation preference. In step 325, the abbreviation-adjusted communication can be conveyed to the corresponding recipient.

Figure 4:
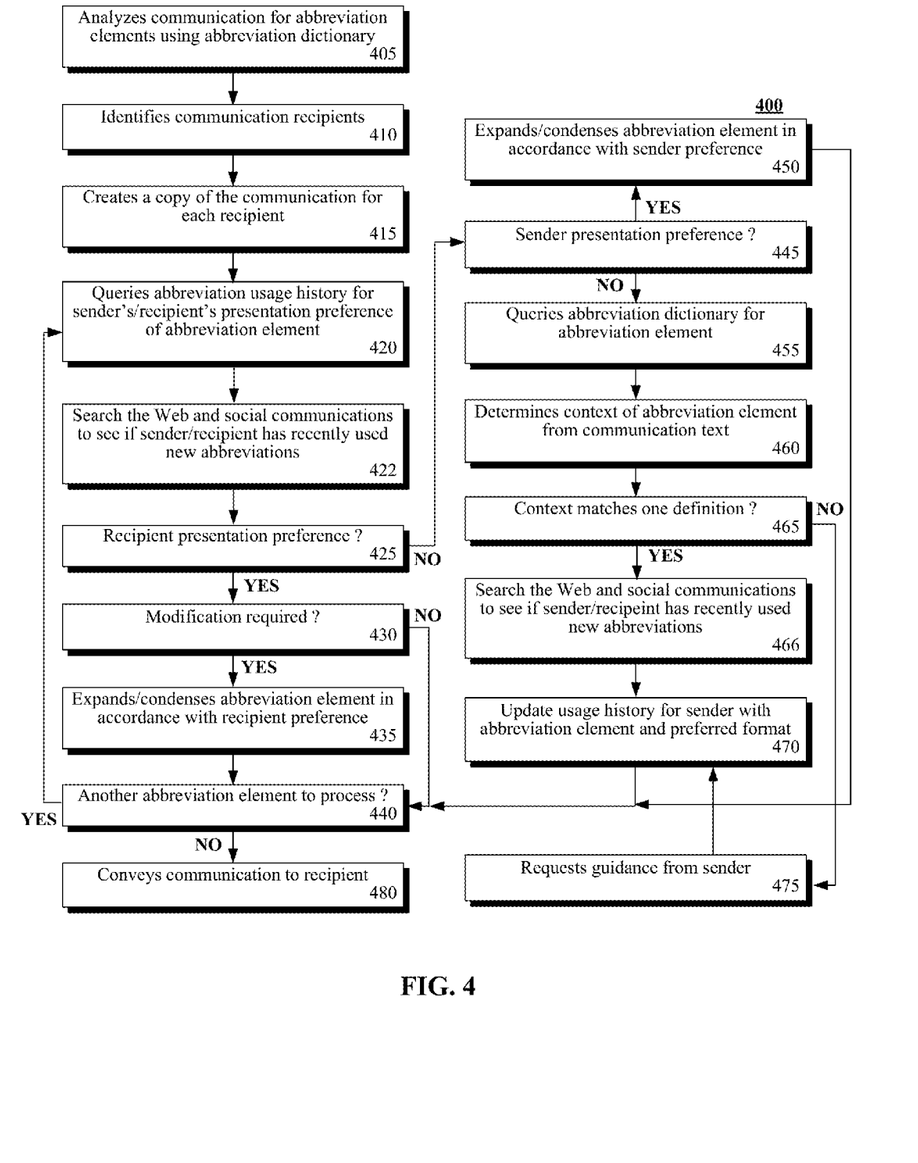
FIG. 4 is a flowchart of a method detailing the generation of an abbreviation-adjusted communication by the intelligent abbreviation handler in accordance with embodiments of the inventive arrangements disclosed herein.

FIG. 4 is a flowchart of a method 400 detailing the generation of an abbreviation-adjusted communication by the intelligent abbreviation handler in accordance with embodiments of the inventive arrangements disclosed herein. Method 400 can be performed within the context of system 200, and/or in conjunction with methods 100 and/or 300.

Method 400 can begin in step 405 where the abbreviation usage history can analyze the communication for abbreviation elements using the abbreviation dictionary. The recipients of the communication can be identified in step 410.

In step 415, a copy of the communication can be created for each recipient. The abbreviation usage history can be queried for the sender's and/or recipients' presentation preference of each abbreviation element in step 420. In step 422, the Web, social communications, and other external searches can be optionally searched to see if the sender and/or recipient has recently used new abbreviations. If so, the abbreviation usage history can be updated to include the new abbreviations. In one embodiment, Web content and the social communications can be dated and the abbreviation usage history can track updates, so that only those communications dated after the last update will be used to update the abbreviation usage history. In various contemplated embodiments, updates can be periodically performed (date triggered) and/or can be performed based on a detection of an unknown abbreviation within a communication. Additionally, different update cycles can exist for the sender and the recipient. For example, the recipient's abbreviation usage history can be updated in step 422 and the sender's can be updated in step 466. Two different locations are intentionally shown for these updates (step 422 and 466) to emphasize that abbreviation usage history updates can occur in various places in the process shown by method 400.

In step 425, it can be determined if the recipient has a preference indicated in the abbreviation usage history. When the recipient has a preference in the abbreviation usage history for the abbreviation element, it can be determined if the recipient's preference requires modification to the abbreviation element within the communication in step 425. When modification of the abbreviation element is required, step 435 can be executed where the abbreviation element is expanded or condensed according to the recipient's preference.

Upon completion of step 435 or when modification of the abbreviation element is not required, it can be determined if there is another abbreviation element to process for the communication in step 440. When another abbreviation element requires handling, flow of method 400 can return to step 420 to restart the process of handling the abbreviation element.

When it is determined that there are no other abbreviation elements to process in step 440, method 400 can proceed to step 480 where the communication can be conveyed to the recipient.

When, in step 425, it is found that the recipient does not have a preferred format for using the abbreviation element in the abbreviation usage history, step 445 can execute where it can be determined if the sender has a preference in the abbreviation usage history for the abbreviation element.

When the sender has a preference in the abbreviation usage history, the abbreviation element can be expanded or condensed in accordance with that preference in step 450. From step 450, the flow of method 400 can proceed to step 440 to determine the need to continue processing abbreviation elements.

It should be noted that use of the sender's preference as contained in the abbreviation usage history can be used to illustrate only one possible means of handling an abbreviation element for which a recipient does not have a preference. As an alternate example, method 400 can flow directly to step 455 or step 475 from step 425. Further, this handling can be influenced by user-configurable parameters on the part of the sender and/or recipient. In another embodiment, an unknown abbreviation element (for which a recipient doesn't have a preference) can trigger an abbreviation usage history update (as shown by step 422 or 466, for example).

When the sender does not have a presentation preference for the abbreviation element, representing a scenario where usage of the abbreviation element is new to both the sender and recipient, step 455 can be performed where the intelligent abbreviation handler can query the abbreviation dictionary for the abbreviation element. The context of the abbreviation element can be determined for the abbreviation element from the text of the communication in step 460.

Assuming that at least one entry for the abbreviation element was found for the abbreviation element in step 455, it can be determined if the context of the abbreviation element determined in step 460 matches one of the definitions in step 465. An optional update of the abbreviation usage history can occur in step 466, in one embodiment. When an exact match for the abbreviation element is not found, step 475 can be executed where the intelligent abbreviation handler can request guidance from the sender regarding the definition and/or handling of the abbreviation element.

Step 475 can represent a scenario where multiple definitions of an abbreviation element can be applicable to the context in which the abbreviation element is used within the text of the communication. For example, in a email about computer systems, the definitions, "WEBSPHERE Application Server", "Web Application Server", and "Wide Area System", can all determined as possible meanings for the abbreviation element, "WAS".

However, when there is an exact match for the context of the abbreviation element or upon guidance received from the sender in response to step 475, step 470 can be performed where the abbreviation usage history of the sender can be updated with the abbreviation element and the preferred format. Updates can include checking external sources for updates as well (as shown by step 422 and 466), which can optionally occur at this point (instead of at separate step 466, for example). From step 470, flow can proceed to step 440 to determine the need to continue processing abbreviation elements.

Figure 5:
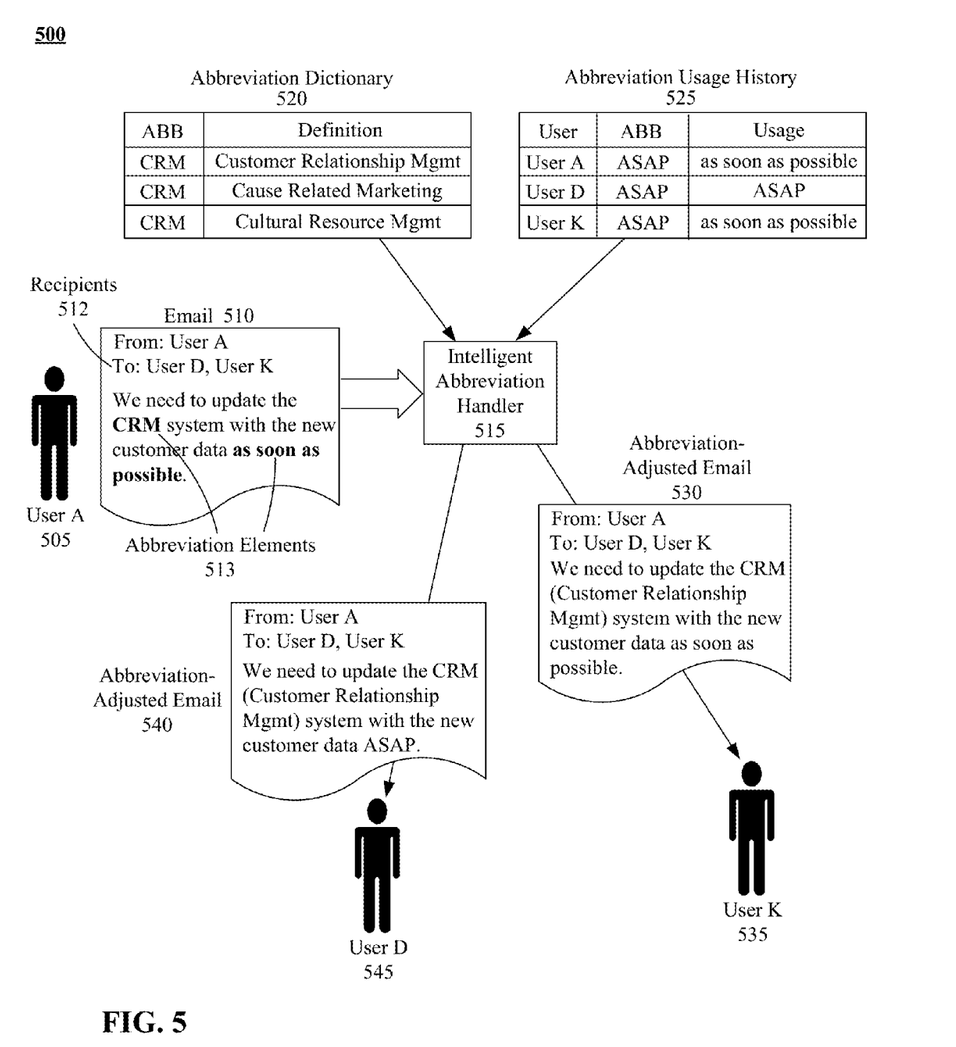
FIG. 5 is an example scenario illustrating the generation of individualized abbreviation-adjusted emails by the intelligent abbreviation handler in accordance with embodiments of the inventive arrangements disclosed herein.

FIG. 5 is an example scenario 500 illustrating the generation of individualized abbreviation-adjusted emails 530 and 540 by the intelligent abbreviation handler 515 in accordance with embodiments of the inventive arrangements disclosed herein. Example scenario 500 can utilize the concepts taught in system 200, and/or methods 100, 300, and/or 400.

In the example scenario 500, User A 505 can compose an email 510 to be sent to two recipients 512—User K 535 and User D 545. As shown, the email 510 can include two abbreviation elements 513—the condensed abbreviation element 513, "CRM", and the expanded abbreviation element 513, "as soon as possible".

Once User A 505 sends the email 510, the intelligent abbreviation handler 515 component of the email system can begin processing the email 510. Following the basic steps outlined in methods 300 and 400, the intelligent abbreviation handler 515 can address the first abbreviation element 513, "CRM".

Searching the abbreviation usage history 525, the intelligent abbreviation handler 515 can find that neither User A 505, User K 535, or User D 545 have a historical preference for using the abbreviation element 513 "CRM". Querying the abbreviation dictionary 520, the intelligent abbreviation handler 515 can be presented with three possible meanings of the abbreviation element 513 "CRM".

Contextual analysis of the email 510 can identify that the use of the word "customer" is meaningful to one possible definition in the abbreviation dictionary 520—Customer Relationship Management. Therefore, the intelligent abbreviation handler 515 can conclude that this definition is most likely the meaning intended by User A 505.

In this example 500, the intelligent abbreviation handler 515 can be configured to provide both formats of an abbreviation element 513 that was previously unused by the sender and recipient. Thus, the abbreviation-adjusted emails 530 and 545 that will be sent to User K 535 and User D 545, respectively, can both contain the condensed and expanded formats for the abbreviation element 513 "CRM".

The intelligent abbreviation handler 515 can then proceed to process the second abbreviation element 513 "as soon as possible". The abbreviation usage history 525 contains entries indicating how User K 535 and User D 545 have used this abbreviation element 513 in past emails 510. Therefore, the intelligent abbreviation handler 515 can replace the expanded format with the condensed format in the abbreviation-adjusted email 540 for User D 545, while leaving the format unchanged in the abbreviation-adjusted email 530 for User K 535, since User K's 535 preference matches the format of the original email 510.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   identifying at least one abbreviation element in a received text-based electronic communication that is addressed to at least one recipient;
   determining a presentation preference of the at least one recipient for the at least one identified abbreviation element from an abbreviation usage history data, wherein the abbreviation usage history data represents a preference of a sender for the abbreviation element when sending text-based electronic communications to others;
   creating an abbreviation-adjusted text-based electronic communication for each recipient using the received text-based electronic communication and the determined presentation preference for a recipient for the at least one abbreviation element; and
   modifying abbreviation elements based on the preference of the sender, for generating the abbreviated-adjusted text-based electronic communication, when presentation preference of the recipient for the at least one abbreviation element is not present in the recipient's abbreviation usage history data.

2. The method of claim 1, further comprising:
   compiling abbreviation usage history data for a plurality of abbreviation elements by an abbreviation handler component of a text-based electronic communications system.

3. The method of claim 2, wherein said abbreviation usage history data is applicable to identified users of the text-based electronic communications system.

4. The method of claim 1, wherein the at least one abbreviation element comprises at least one of an abbreviation, an acronym, and an initialism.

5. The method of claim 1, wherein the abbreviation element is presented in one of a condensed format and an expanded format, wherein the expanded format expresses a full meaning of the condensed format of the abbreviation element.

6. The method of claim 1, wherein identifying the at least one abbreviation element further comprises:
   analyzing textual contents of the received text-based electronic communication with respect to an abbreviation dictionary, wherein said abbreviation dictionary contains a plurality of pairings that associate condensed formats of abbreviation elements with corresponding expanded formats; and
   when a portion of the textual contents match an entry in the abbreviation dictionary, flagging said portion as an abbreviation element.

7. The method of claim 1, wherein the determination of the presentation preference further comprises:
   querying abbreviation usage history data for a combination of the recipient and either a condensed format or an expanded format of an identified abbreviation element; and
   when the combination exists in the abbreviation usage history data, designating a format contained in the combination as the presentation preference of the recipient for the identified abbreviation element.

8. The method of claim 7, further comprising:
   when the combination is absent from the abbreviation usage history data, querying the abbreviation dictionary for the identified abbreviation element;
   determining a context in which the identified abbreviation element is used within the text-based electronic communication;
   correlating the determined context of the identified abbreviation element with query results from the abbreviation dictionary; and
   when a match exists between the determined context and a single entry from the abbreviation dictionary, updating the abbreviation usage history data for a sender of the text-based electronic communication with the identified abbreviation element.

9. The method of claim 8, further comprising:
   when the determined context matches multiple entries from the abbreviation dictionary, requesting clarification from the sender of the text-based electronic communication; and
   updating the abbreviation usage history data for the sender with the clarification received from the sender.

10. The method of claim 7, further comprising:
    when the combination is absent from the abbreviation usage history data, requesting clarification from a sender of the text-based electronic communication; and
    updating the abbreviation usage history data for the sender with the clarification received from the sender.

11. The method of claim 7, further comprising:
    when the combination is absent from the abbreviation usage history data, querying the abbreviation usage history data for a combination of a sender of the text-based electronic communication and either a condensed format or an expanded format of the identified abbreviation element; and
    when the combination exists in the abbreviation usage history data, designating the format contained in the combination as the presentation preference of the recipient for the identified abbreviation element.

12. The method of claim 7, further comprising:

when the combination is absent from the abbreviation usage history data and absent from the abbreviation dictionary for the identified abbreviation element, searching Web content, social communications, or both for the identified abbreviation element and updating the abbreviation usage history data using results from the searching.

13. The method of claim 1, wherein creating of the abbreviation-adjusted text-based electronic communication further comprises:

copying the received text-based electronic communication;

when an existing format of an identified abbreviation element differs from the format contained in the presentation preference, automatically replacing the existing format of the identified abbreviation element with the format from the presentation preference; and once all identified abbreviation elements have been addressed, designating the copy of the received text-based electronic communication as the abbreviation-adjusted text-based electronic communication for the recipient.

* * * * *